United States Patent
Parks, III et al.

(10) Patent No.: US 9,613,359 B2
(45) Date of Patent: Apr. 4, 2017

(54) DISTRIBUTION INTERCONNECTION INFORMATION SYSTEMS AND METHODS

(71) Applicant: San Diego Gas & Electric Company, San Diego, CA (US)

(72) Inventors: Arney Kenneth Parks, III, El Cajon, CA (US); Rachel Romani Briles, San Diego, CA (US); Patricia May Juengst, La Mesa, CA (US); Vy Nguyen, San Diego, CA (US); Rob Malowney, San Diego, CA (US); Steve Weingartner, Murrieta, CA (US); Gerard Tynen, Carlsbad, CA (US); Aaron Gregory Franz, San Diego, CA (US); Michael A. Hughes, Ramona, CA (US)

(73) Assignee: SAN DIEGO GAS & ELECTRIC COMPANY, San Diego, CA (US)

( * ) Notice: Subject to any disclaimer, the term of this patent is extended or adjusted under 35 U.S.C. 154(b) by 57 days.

(21) Appl. No.: 14/622,359

(22) Filed: Feb. 13, 2015

(65) Prior Publication Data

US 2015/0233733 A1 Aug. 20, 2015

Related U.S. Application Data

(60) Provisional application No. 61/941,415, filed on Feb. 18, 2014.

(51) Int. Cl.
*G06Q 30/00* (2012.01)
*G06Q 10/10* (2012.01)

(52) U.S. Cl.
CPC ......... *G06Q 30/0185* (2013.01); *G06Q 10/10* (2013.01)

(58) Field of Classification Search
CPC ........ G01R 1/0416; G01R 3/00; G01R 29/18; G01R 31/086; H01R 33/94; H01R 33/7635; B60L 11/1848; G06Q 10/10; G06Q 30/0185
USPC .................................... 340/870.02
See application file for complete search history.

(56) References Cited

U.S. PATENT DOCUMENTS

| | | | |
|---|---|---|---|
| 9,111,321 B2* | 8/2015 | Bullen | G06Q 30/02 |
| 2008/0091626 A1* | 4/2008 | Kremen | G06Q 40/00 |
| | | | 705/412 |
| 2008/0177678 A1* | 7/2008 | Di Martini | G01D 4/002 |
| | | | 705/412 |
| 2012/0232915 A1* | 9/2012 | Bromberger | G01D 4/004 |
| | | | 705/1.1 |
| 2014/0142774 A1* | 5/2014 | Katayama | G06Q 50/06 |
| | | | 700/291 |
| 2014/0211345 A1* | 7/2014 | Thompson | B60L 11/1816 |
| | | | 361/42 |
| 2014/0375126 A1* | 12/2014 | Kitagishi | G06Q 30/06 |
| | | | 307/29 |
| 2015/0054830 A1* | 2/2015 | Inuzuka | H02J 13/001 |
| | | | 345/440 |

(Continued)

*Primary Examiner* — Hirdepal Singh
(74) *Attorney, Agent, or Firm* — Sheppard, Mullin, Richter & Hampton LLP

(57) ABSTRACT

A distribution interconnection system processes and manages interconnections into the distribution system for utilities. Various embodiments may manage and facilitate the application process. In addition, utilities may track and manage unauthorized operators, for example, via a reverse power flow detection process.

18 Claims, 15 Drawing Sheets

(56) References Cited

U.S. PATENT DOCUMENTS

2015/0120227 A1* 4/2015 Kashiwagi ......... G01R 19/0092
                                                    702/64
2015/0160040 A1* 6/2015 Furukawa ........... H02J 13/0086
                                                    340/870.09

* cited by examiner

DISTRIBUTION INTERCONNECTION INFORMATION SYSTEMS AND METHODS

CROSS-REFERENCE TO RELATED APPLICATIONS

This application claims the benefit of U.S. Provisional Patent Application No. 61/941,415 filed Feb. 18, 2014, the content of which is incorporated herein by reference in its entirety.

SUMMARY OF THE DISCLOSURE

When a customer wants to interconnect a generating facility, an application is required to be completed and sent to the utility. The utility then needs to re-enter the information in the application into an access database. In addition, the utility employee is required to check the customer's application against the utility records, or public records (e.g., the California State website) for certified equipment for accuracy. When there is an error, the customer must be notified and the application deleted. Attachments and files related to the application need to be emailed to the utility and manually matched up with each application. If the customer or contractor wants to know the status of their application, they would have to call the utility for a status update. Once an Authority Having Jurisdiction ("AHJ") Inspection is received, the utility sends an inspector to the location (e.g., the house) to perform a final inspection. If the customer's meter is unidirectional, the utility puts in a meter order request, and a crew is sent to the customer's house to replace the unidirectional meter with a bidirectional meter.

With the increasing number of customers providing their own form of generation and requesting interconnection, utilities are bogged down with paper processes to track and manage this growing impact. This has become quite cumbersome and costly for the utilities. With respect to managing unauthorized operators, a report of meter tamper alarms is run by Meter Revenue Protection. Additionally, an investigator is sent to the customer's home to identify any energy theft or unauthorized generation. The customer is contacted upon discovery of unauthorized operations, which is usually tracked and monitored manually. If the same customer appears on a subsequent report from Meter Revenue Protection, the information is manually matched to the tracking records (e.g., a spreadsheet) to determine which actions have been taken. If the customer still runs their system, the utility may take follow-up steps, such as sending a regular or certified letter. Unauthorized operation of photovoltaic systems also raises a major concern in the utility industry.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. They do not limit the breadth, scope, or applicability of the invention. It should be noted that for clarity and ease of illustration these drawings are not necessarily made to scale.

FIGS. 3B-1 to 3B-4 are flow diagrams illustrating an exemplary net energy metering submission process.

FIGS. 3C-1 to 3C-3 are flow diagrams illustrating an exemplary net energy metering business process.

FIG. 4 illustrates an example computing module that may be used to implement various features of the distribution interconnection information systems and methods disclosed herein.

DETAILED DESCRIPTION OF THE EMBODIMENTS OF THE DISCLOSURE

In the following description, numerous specific details are set forth to provide a thorough understanding of various embodiment of the present disclosure. It will be apparent however, to one skilled in the art that these specific details need not be employed to practice various embodiments of the present disclosure. In other instances, well known components or methods have not been described in detail to avoid unnecessarily obscuring various embodiments of the present disclosure.

In various embodiments, a distribution interconnection system processes and manages interconnections into the distribution system for utilities. Various embodiments may manage and facilitate the application process. In addition, utilities may track and manage unauthorized operators, for example, via a reverse power flow detection process. Various embodiments streamline the application process, provide status updates to contractors and customers, and facilitate discovery and managing of unauthorized operators.

In some embodiments, a Fast Track process that allows customers to bypass the utility inspection is provided. Contractors are allowed to do additional uploads such that the application may be routed for a final review. For example, once the AHJ inspection is received, the application may bypass additional inspections and proceed directly to the final review. As such, the timeframe for interconnection authorization is significantly decreased. Furthermore, various embodiments may monitor and manage unauthorized systems. In some embodiments, an unauthorized reverse power flow process is provided. Unauthorized systems may be tracked and managed, and reports of unauthorized operators may be generated.

Figure 1:
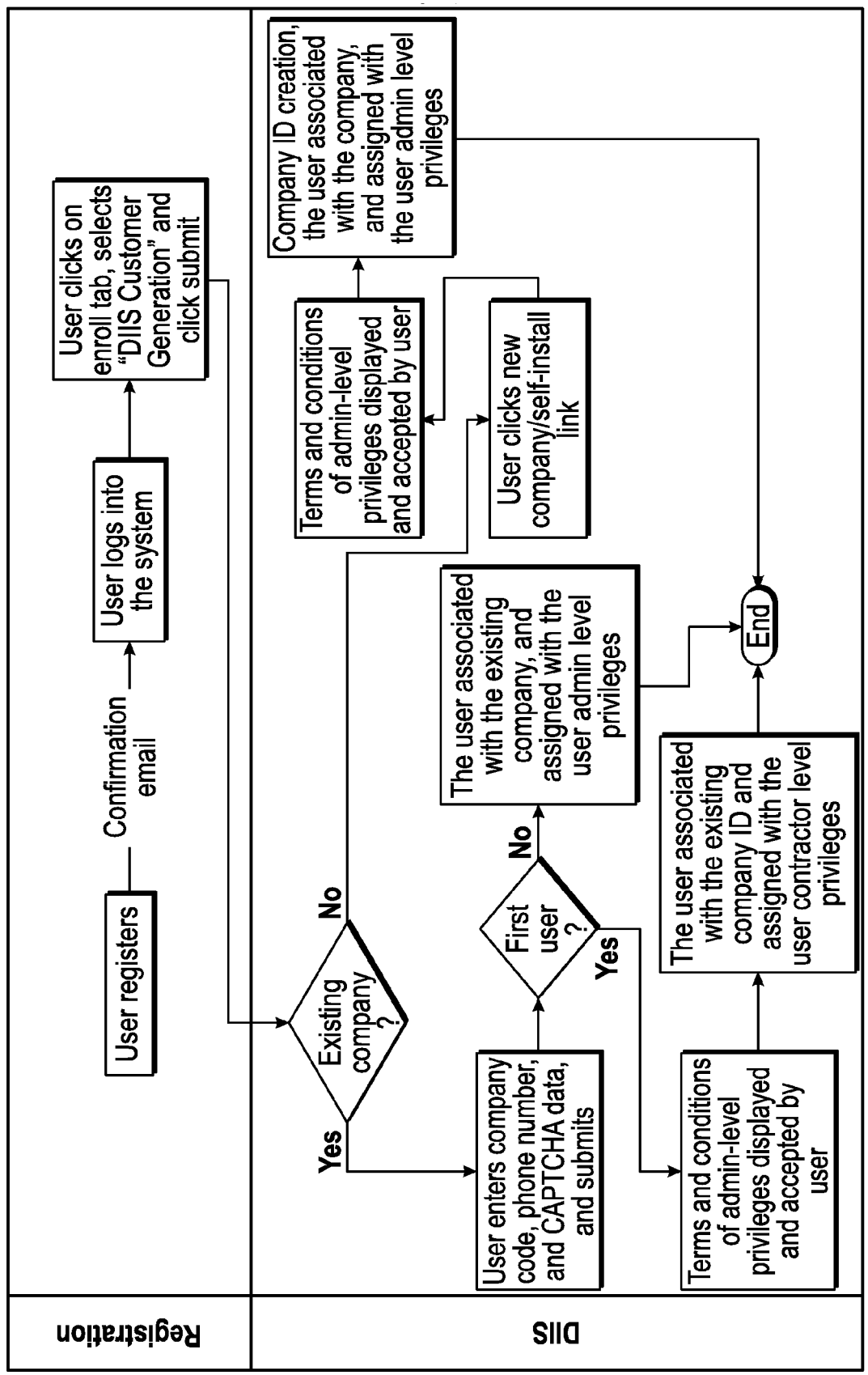
FIG. 1 is a flow diagram illustrating an exemplary registration process in accordance with an embodiment.

FIG. 1 is a flow diagram of an exemplary registration process in accordance with an embodiment. In the illustrated example, a user may register for a distribution interconnection information system ("DIIS"). A company record may be created to include a company ID, a company code, and/or a phone number. In some embodiments, when creating a company record, the user may provide information and be asked to provide Completely Automated Public Turing test to tell Computers and Humans Apart ("CAPTCHA") data before submitting the company information. A user may be associated with the company ID and assigned with the user administrative level privileges. In various embodiments, the terms and conditions of privileges for various levels may be displayed to the user in a splash screen.

Figure 2A:
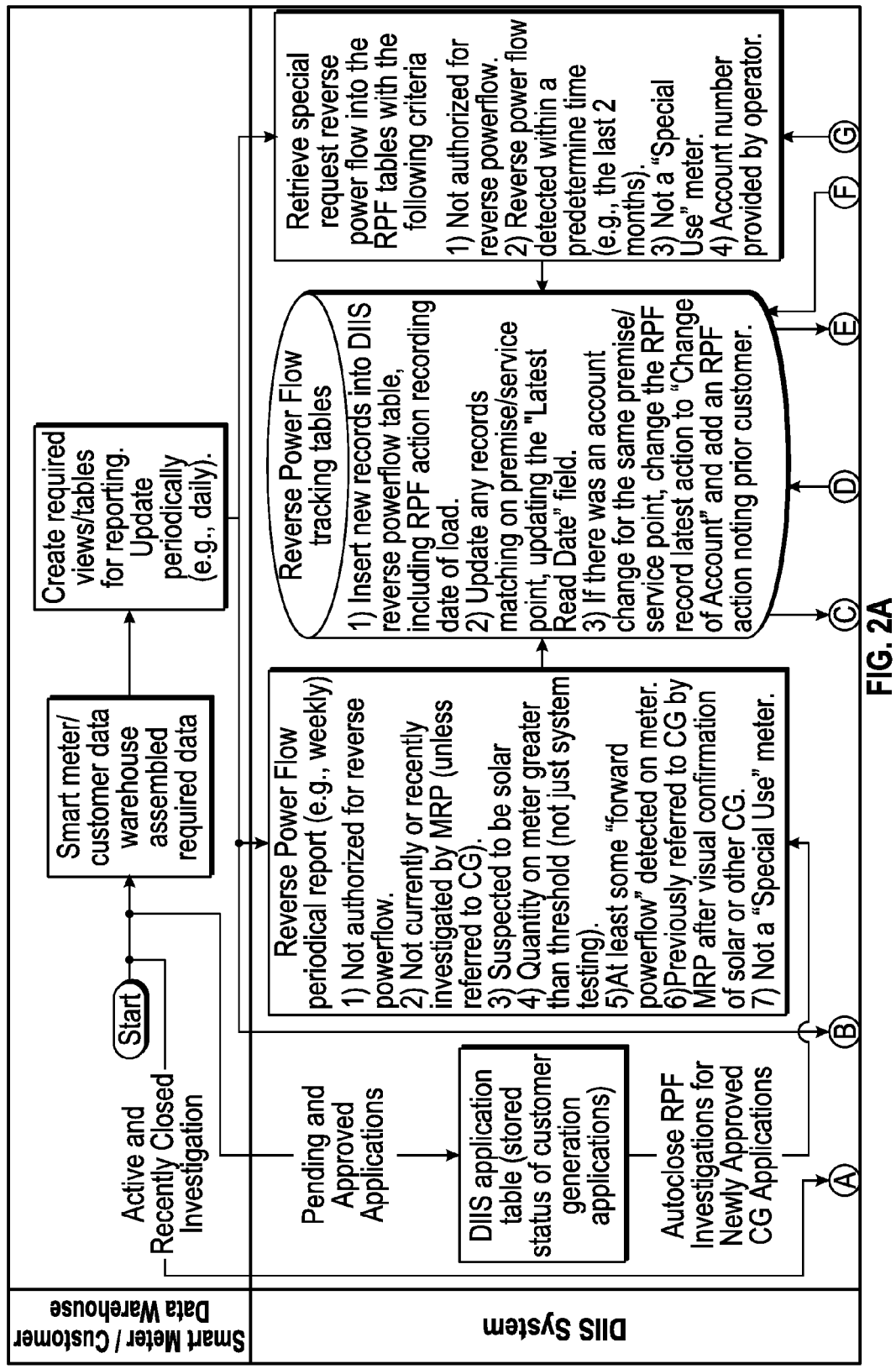
FIGS. 2A and 2B are flow diagrams illustrating an exemplary reverse power flow process in accordance with an embodiment.
Figure 2B:
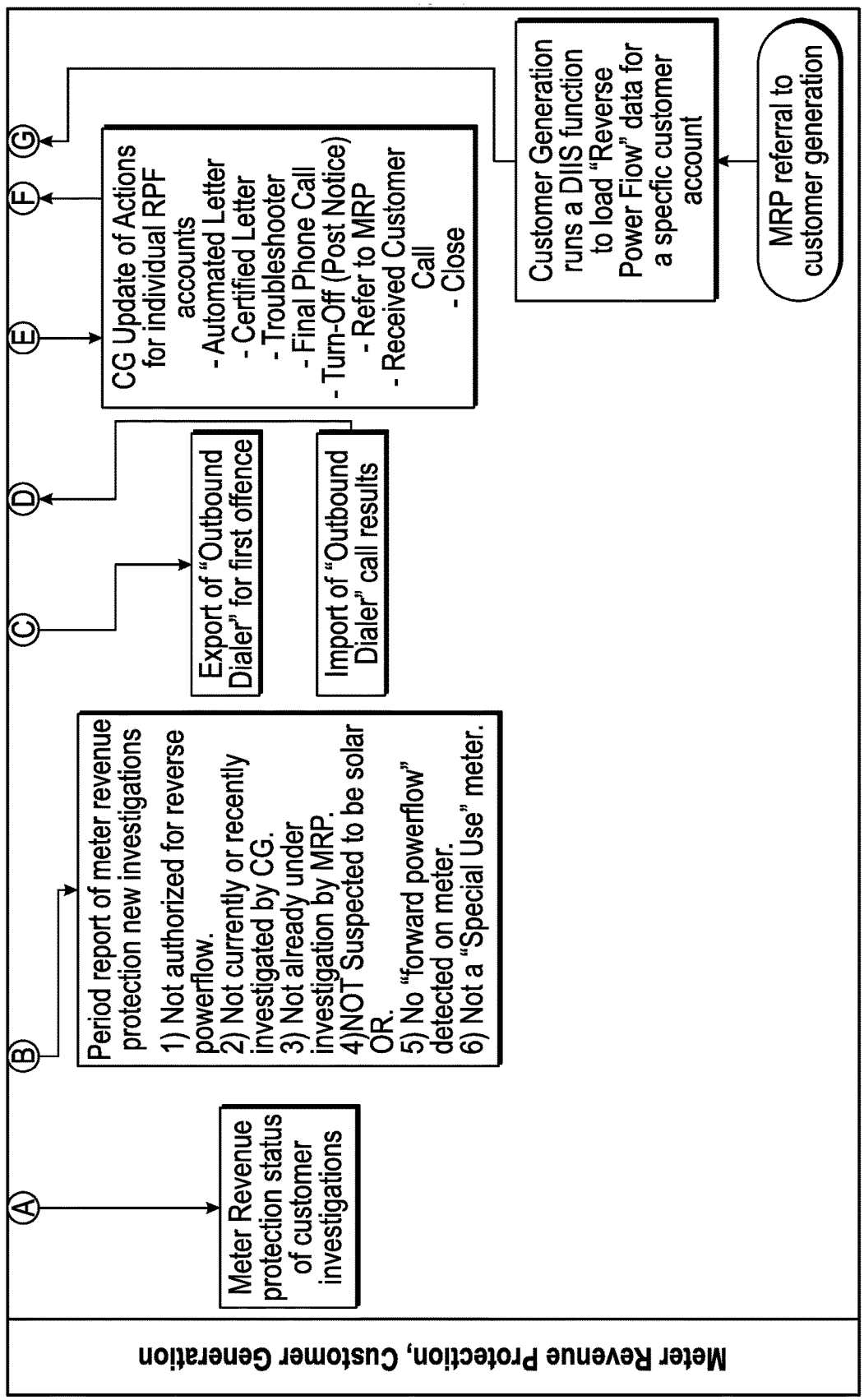

FIGS. 2A and 2B are flow diagrams of an exemplary reverse power flow process in accordance with an embodiment. In various embodiments, the smart meter/customer data warehouse may include data fields such as: (1) Smart Meter register read data; (2) periodical usage difference (e.g., an incremental daily change may be determined from two daily records to capture reverse power flow incremental kwh); (3) a set of known "authorized for reverse power flow" service points (e.g., DIIS application table, statuses 'Approved', 'Pending Final Review' and/or 'Pending SDGE Inspection); (4) meter "reverse power flow" alarm flags; flags for event and flag register reads with event attributes (e.g., "nighttime only", or "daytime only"); (5) flags for meter statuses (e.g., meter was subsequently removed and/or replaced); (6) an updated account number at the time of the register read; an update with the rate code at the time of the register read; (7) an update with Meter program at the time of the register read; (8) flags for register reads that have corresponding interval reads for the reverse power flow; flags for register reads with zero forward power flow; flags for active MRP investigation, flags for recently closed MRP investigation (e.g., within 6 months); (9) flags for active CG investigations, flags for recently closed CG investigations (e.g., investigations within 6 months, investigations within 6 months (1K)); (10) flags for those with "pending" DIIS Applications (e.g., statuses such as 'Submitted', 'Pending AHJ Inspection', 'Issues', 'Received Customer Approval', 'Incomplete', 'Pending Utility Inspection'); (11) flags for those with pending NEM applications (e.g., submitted but before city inspection); (12) CISCO hazard conditions (e.g., a closed CG/DG/PV hazard condition may indicate a successfully city inspection for solar or other generation (i.e. city inspection for Solar)); (13) flags for current CG investigations from the system (e.g., DIIS); the update billing revenue class (e.g., commercial, industrial, residential); a premise/Service point address; (14) a premise/Service point current customer name; (15) an account number; (16) a customer phone number; (17) an account status; and/or (18) total "reverse power flow" shown on the meter since meter install.

In some embodiments, the smart meter register read data can be gathered from specific channels. Power received at the utility company may be recorded even when the meter program is not set up for bi-directional billing. The flag for register reads that have corresponding interval reads for the reverse power flow may indicate a meter program setup for bi-directional reads. The flag for register reads with zero forward power flow may indicate a likely theft or bad install of meter or meter wiring issue. The status "Pending Utility Inspection" may indicate that a solar unit may be the cause for the pending DIIS application.

In various embodiments, one or more flags indicating that a customer generation may be solar may be checked. When a unit is suspected to be a solar unit, the following flags may be checked: (i) the pending DIIS application for customer generation/solar flag; (ii) the received AHJ inspection completion for customer generation/solar flag; the flag for reverse power flow alarm during solar generation times (e.g., Daytime Smart Meter reverse power flow alarm but no nighttime (i.e., during solar non-generation times) alarm), for residential customers only; and/or (iii) the flag indicating that a Meter Program for bi-directional billing has already been set up for the user.

Figure 3A:
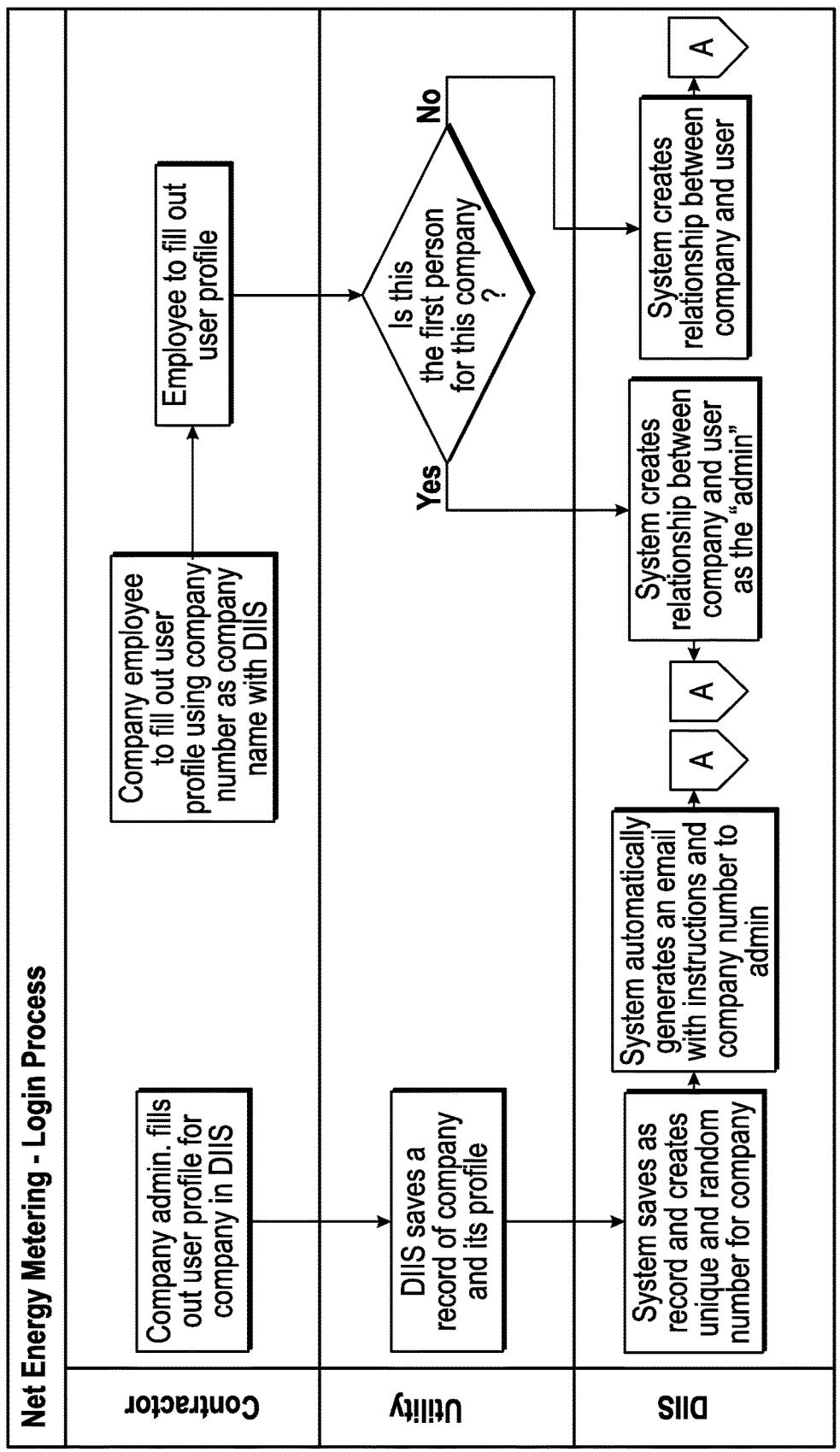
FIG. 3A is a flow diagram illustrating an exemplary net energy metering log in process.
Figures 1, 3B:
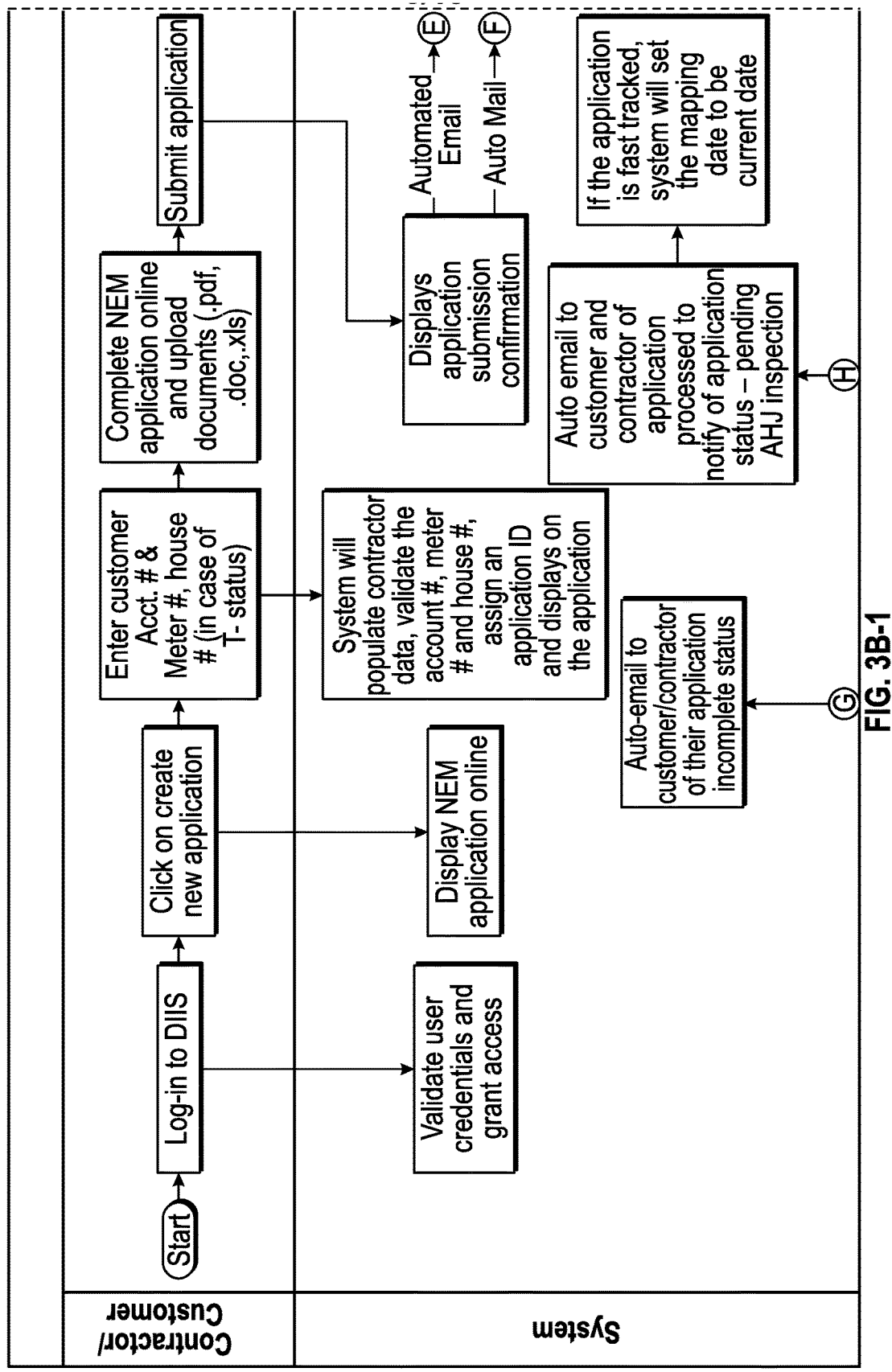
Figures 2, 3B:
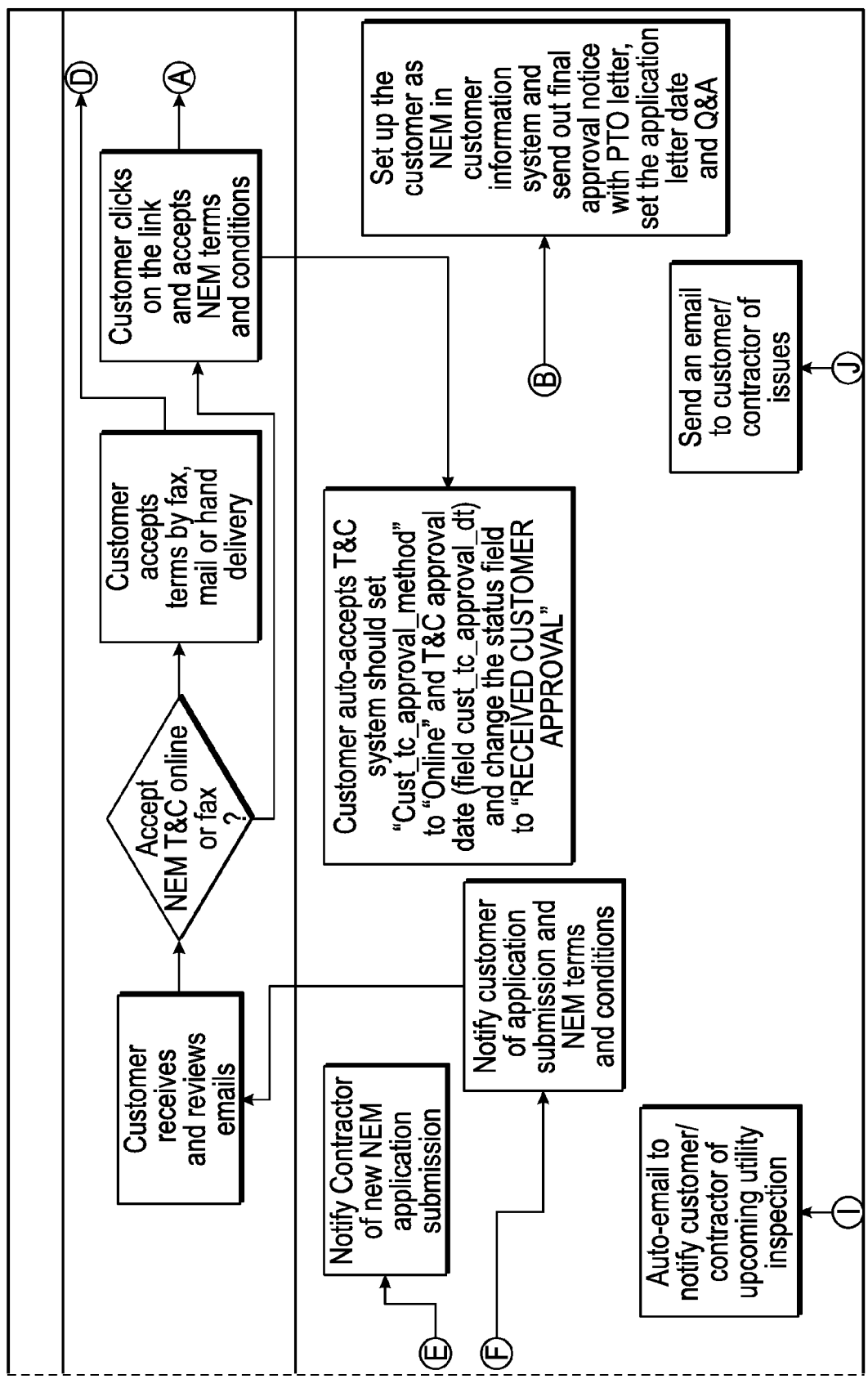

FIG. 3A is a flow diagram of an exemplary net energy metering log in process. FIGS. 3B-1 to 3B-4 are flow diagrams of an exemplary net energy metering submission process. In various embodiments, one or more steps in the illustrated example are subject to a utility field inspection.

Figures 3, 3B:
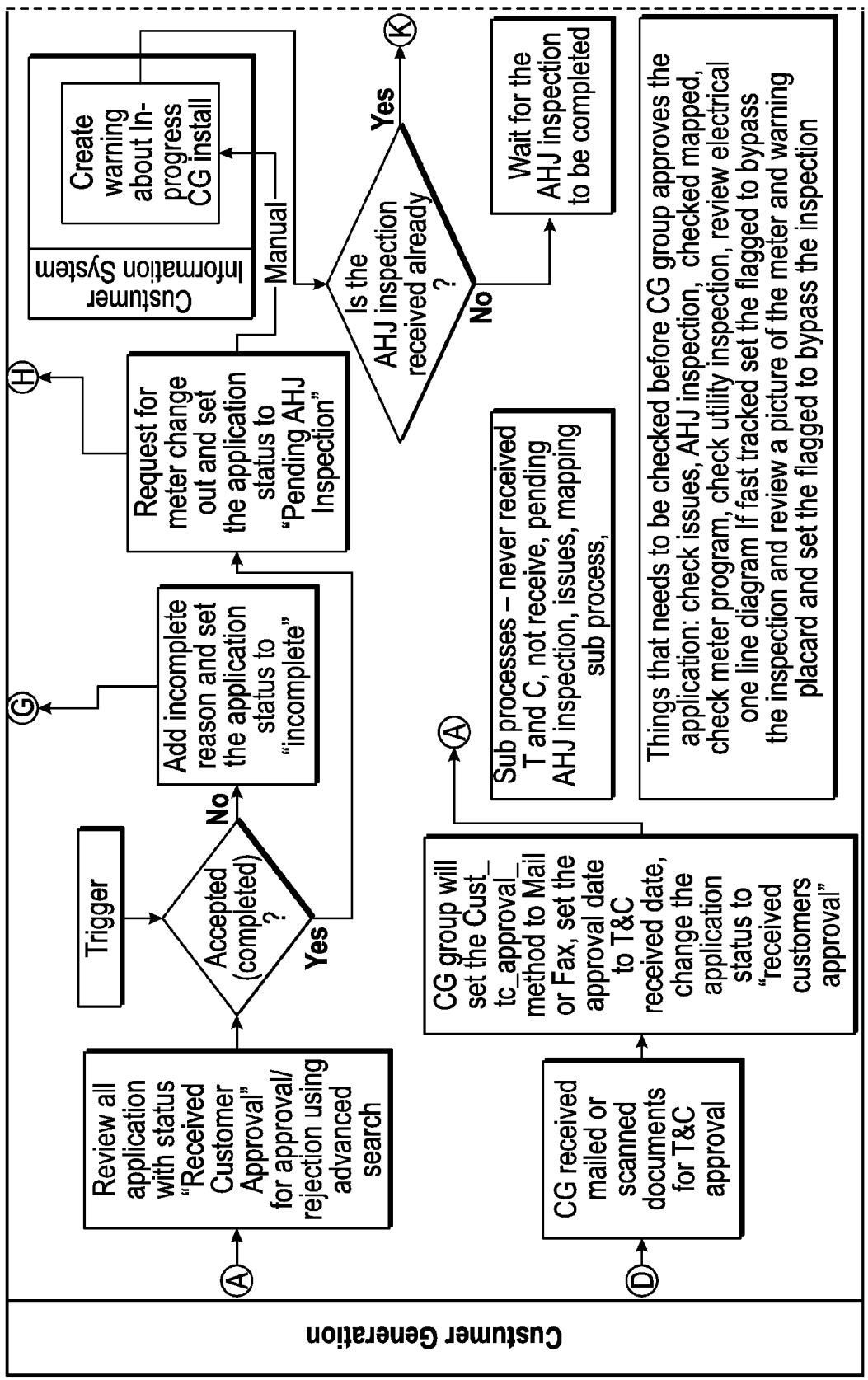
Figures 3, 3B, 4:
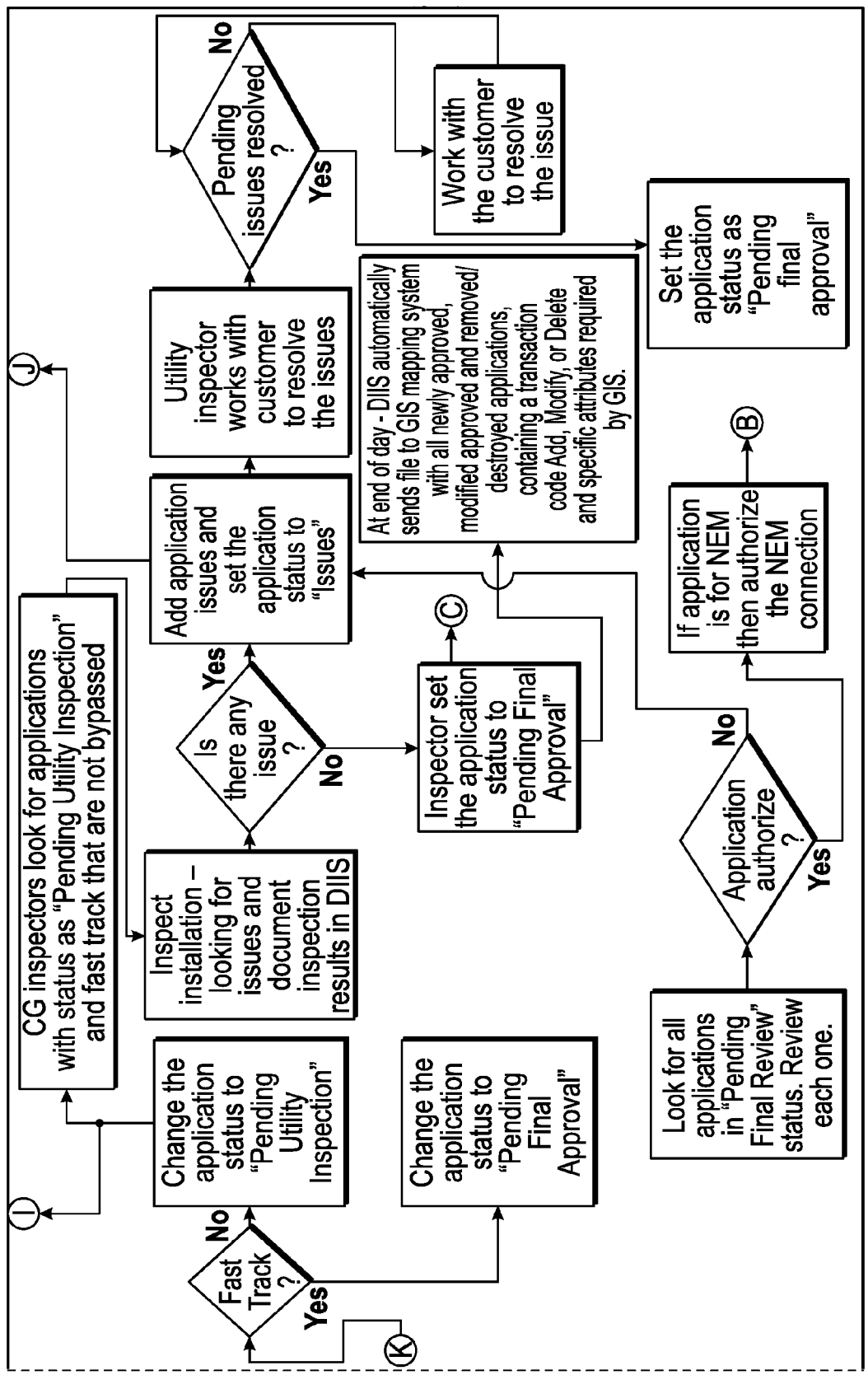
Figures 1, 3C:
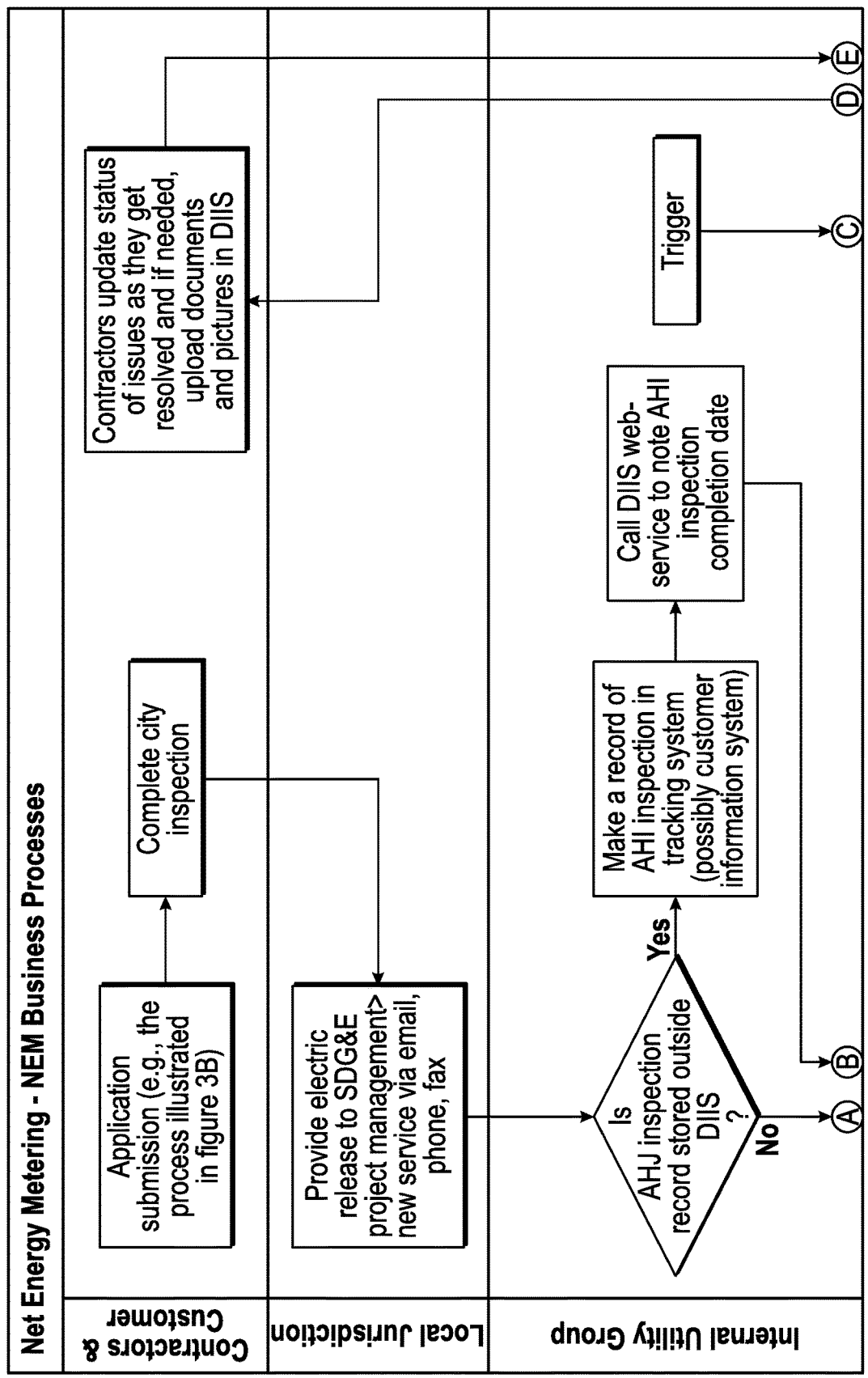
Figures 2, 3C:
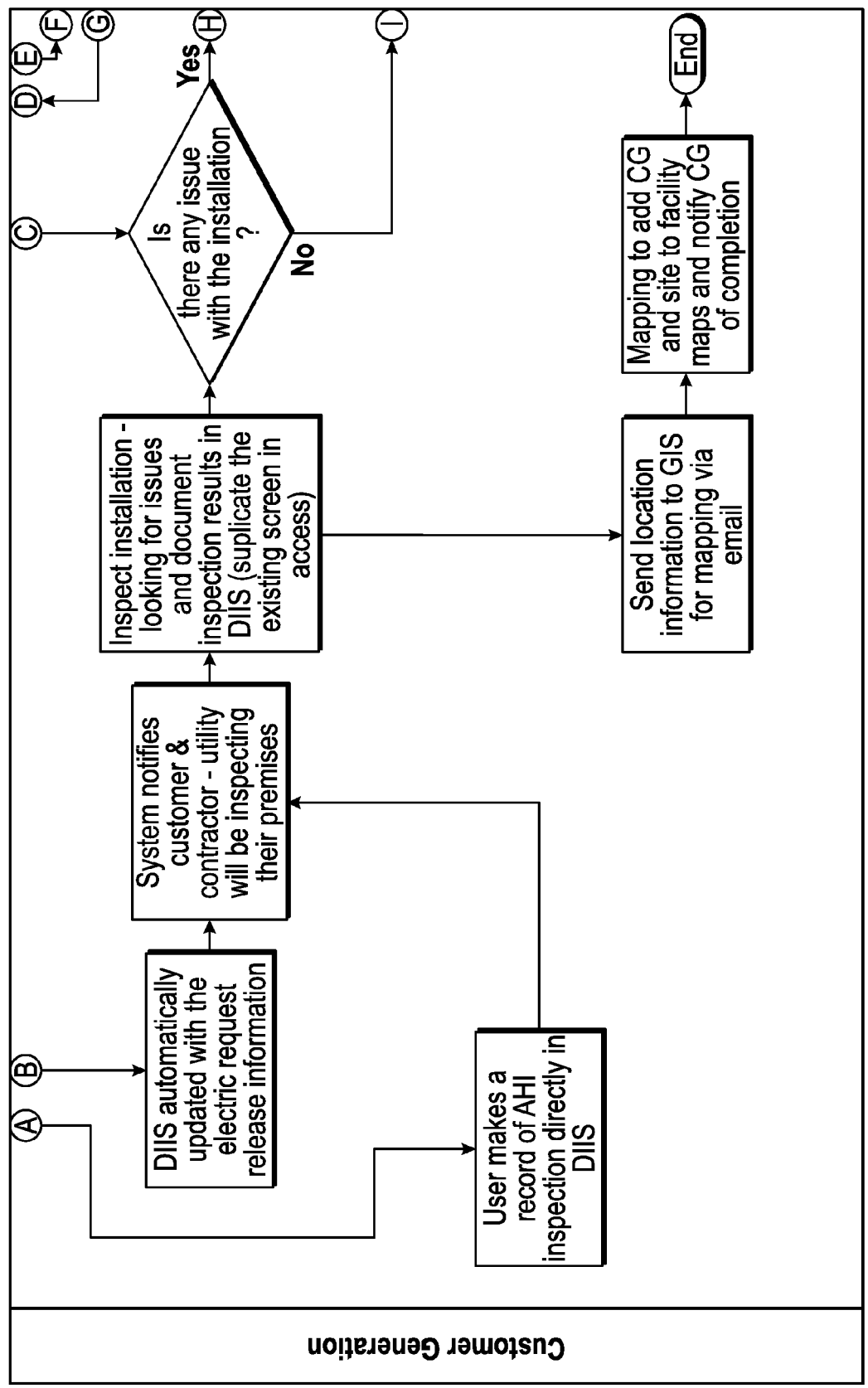
Figures 3, 3C:
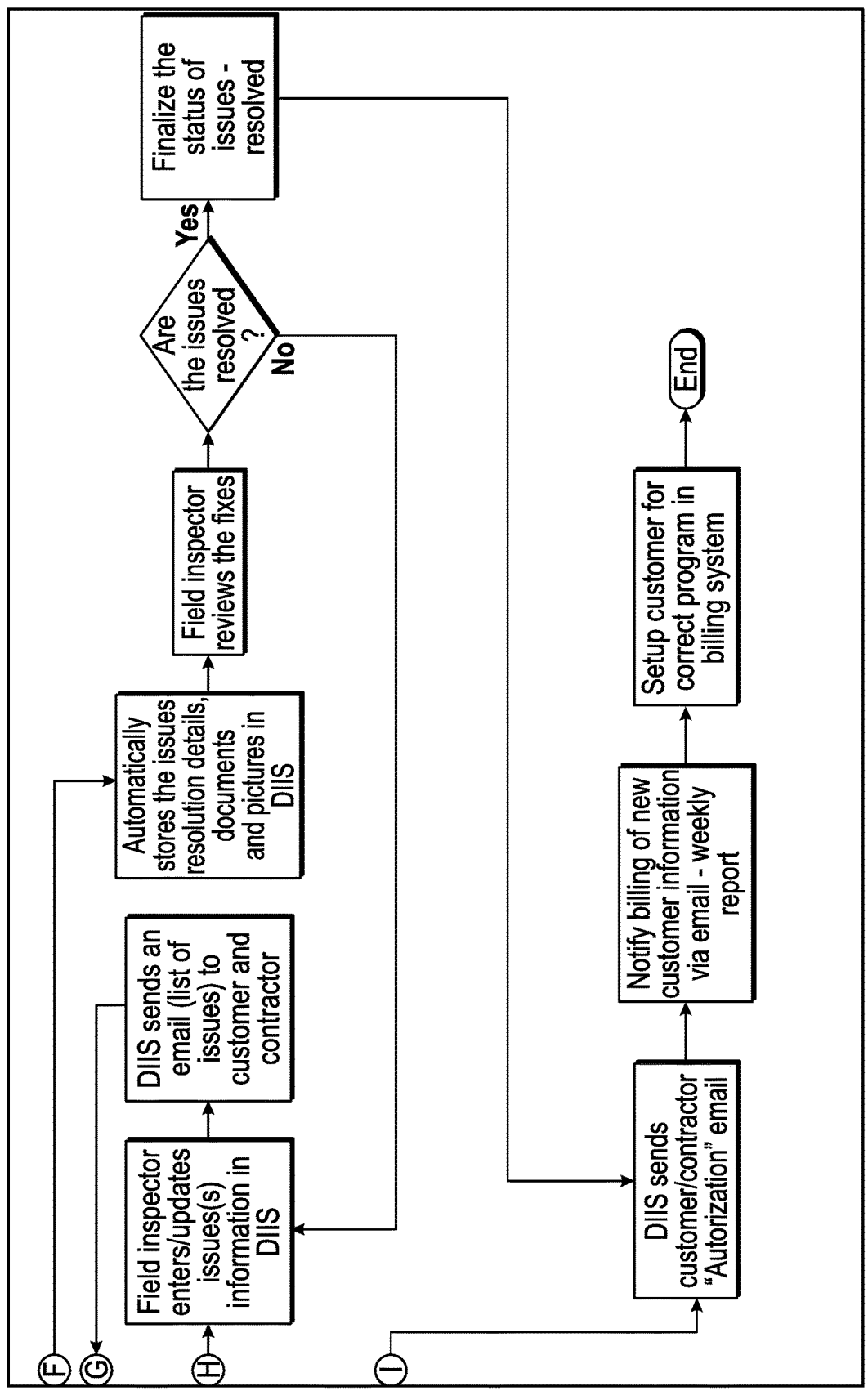

FIGS. 3C-1 to 3C-3 are flow diagrams of an exemplary net energy metering business process. In various embodiments, one or more steps in the illustrated example are subject to a municipal (e.g., a city or a county) inspection, issue resolving, and/or authorization.

Figure 3D:
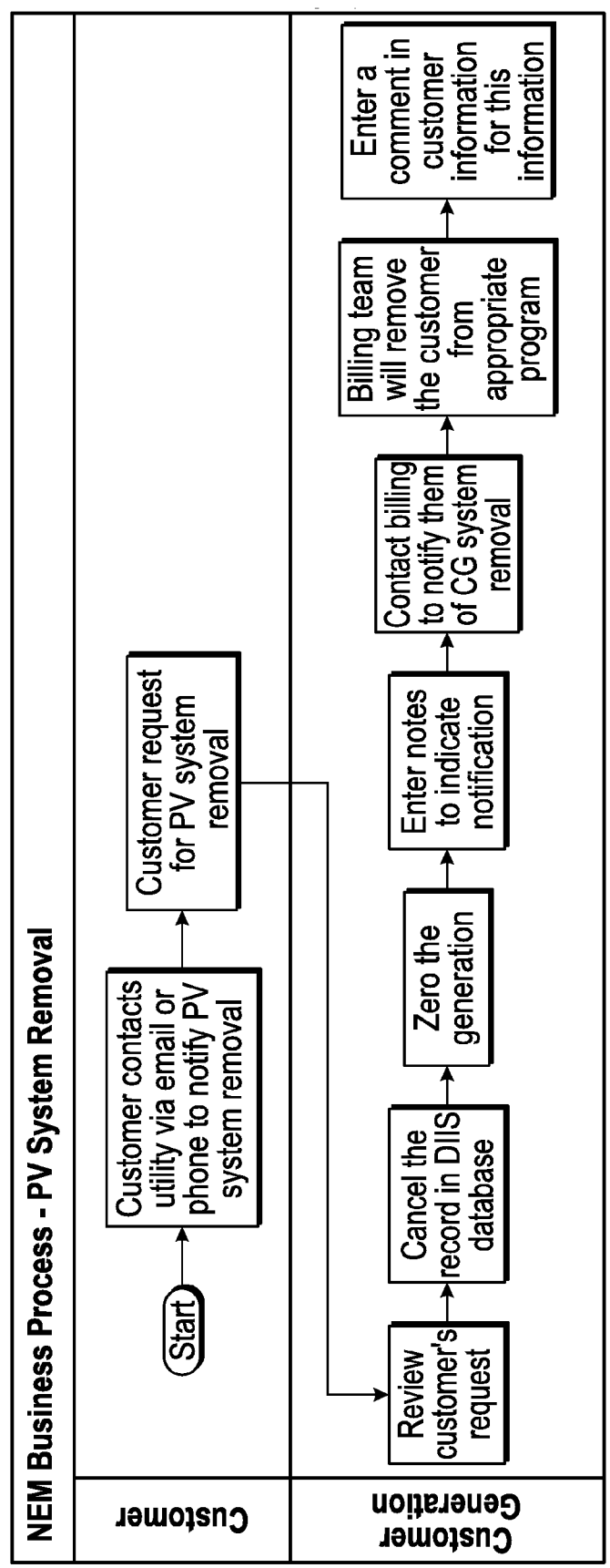
FIG. 3D is a flow diagram illustrating an exemplary net energy metering business process when a PV system is removed.

FIG. 3D is a flow diagram of an exemplary net energy metering business process when a PV system is removed. In various embodiments, one or more steps in the illustrated example are subject to a utility field inspection.

Figure 3E:
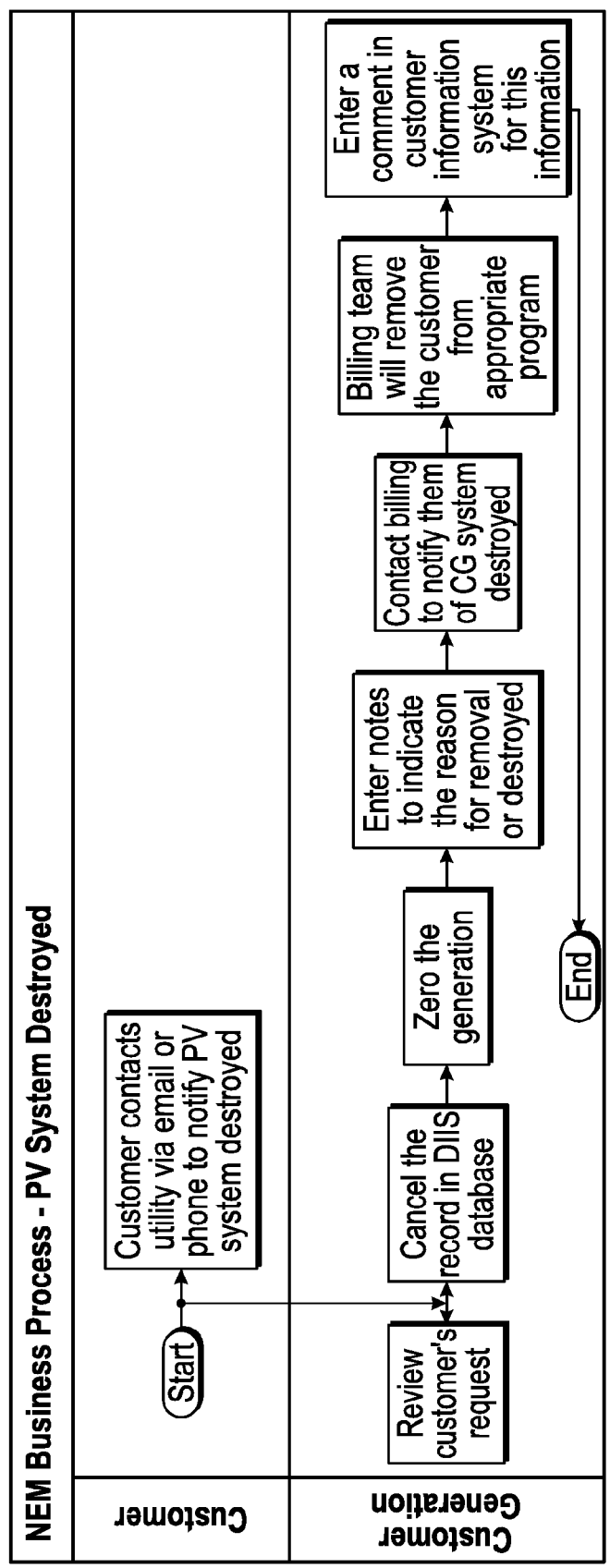
FIG. 3E is a flow diagram illustrating an exemplary net energy metering business process when a PV system is destroyed.

FIG. 3E is a flow diagram of an exemplary net energy metering business process when a PV system is destroyed. In various embodiments, one or more steps in the illustrated example are subject to a utility company's field inspection.

Figure 3F:
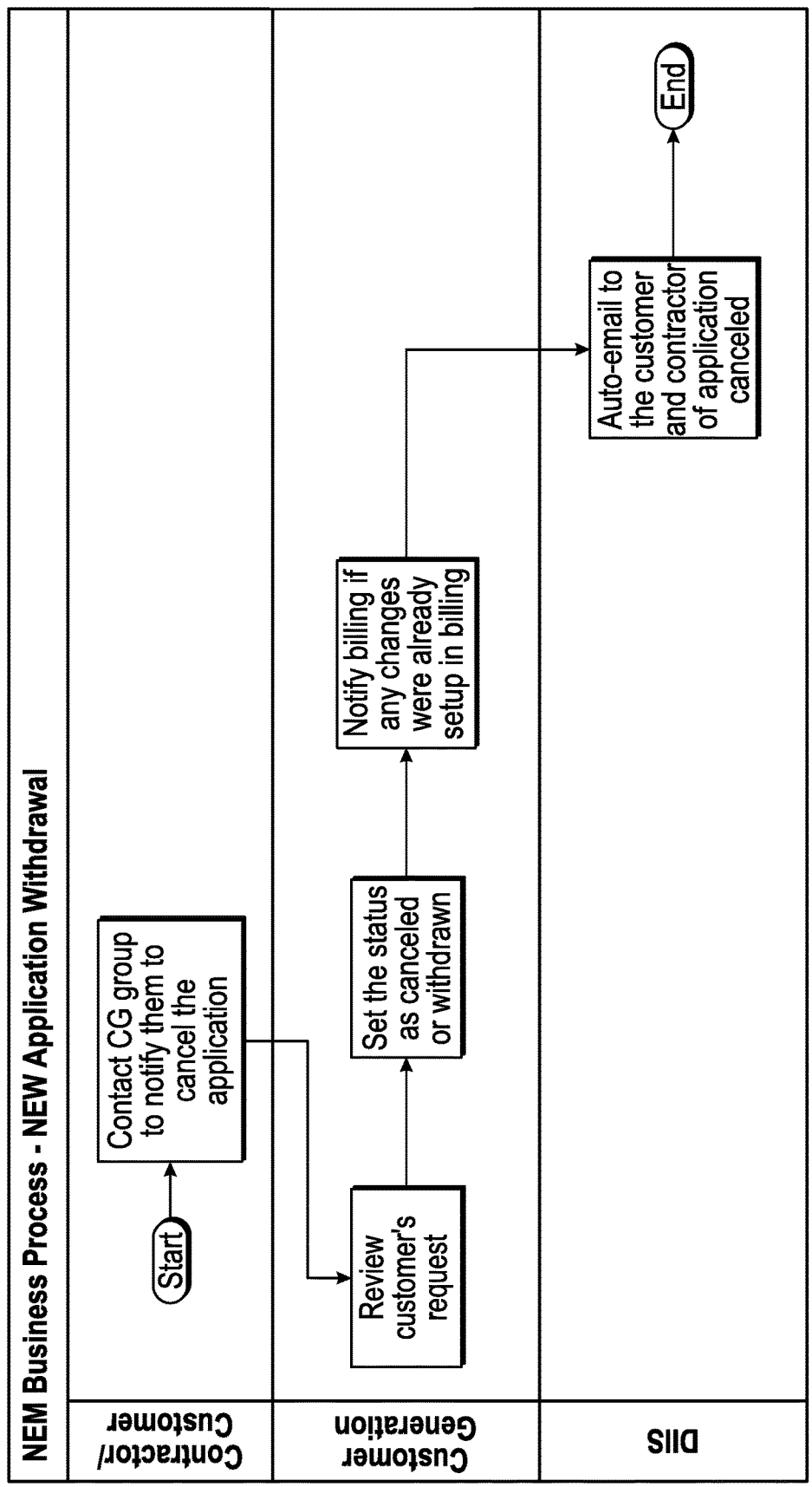
FIG. 3F is a flow diagram illustrating an exemplary net energy metering business process when a PV system is withdrawn.
Figure 4:
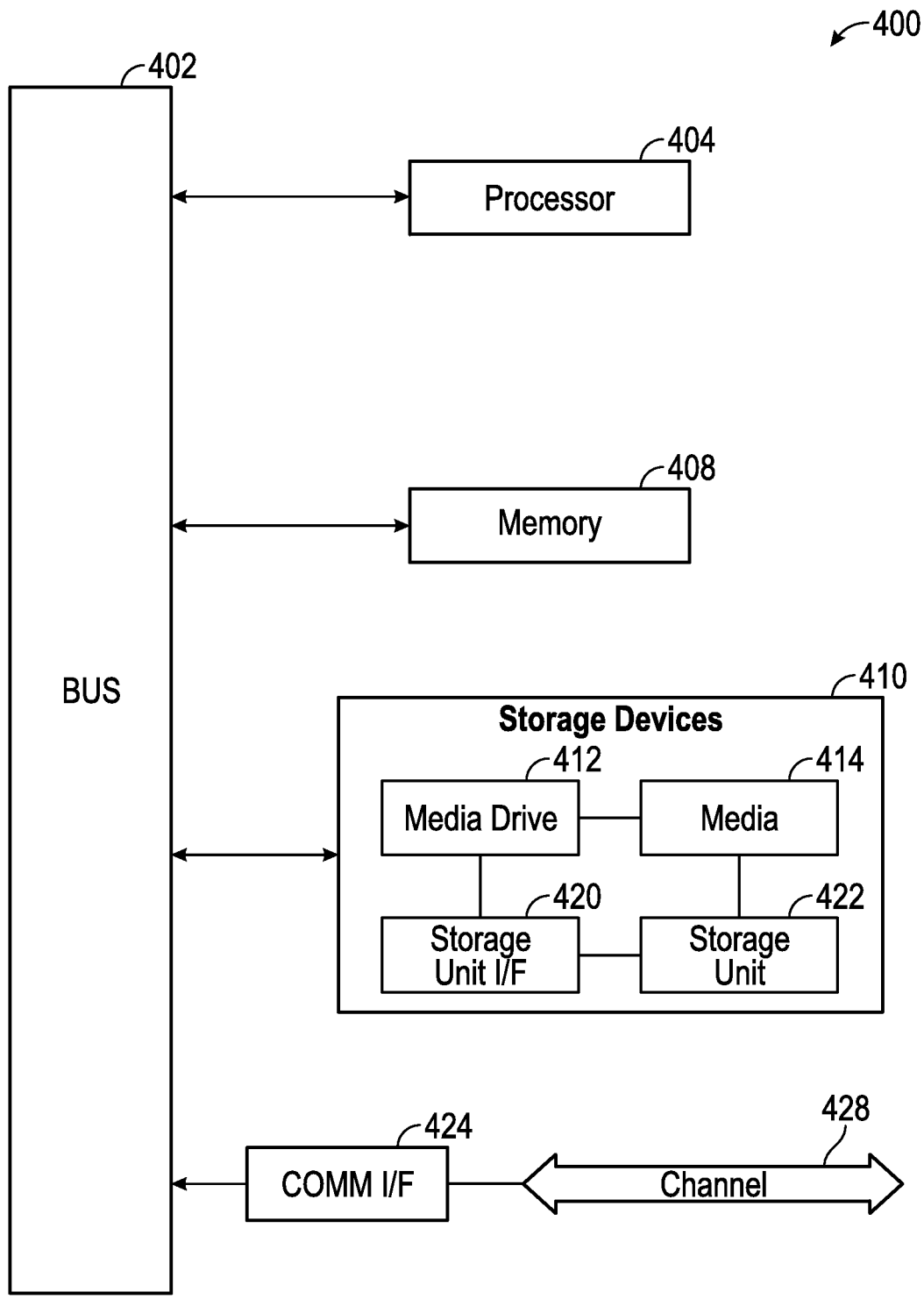

FIG. 3F is a flow diagram of an exemplary net energy metering business process when a PV system is withdrawn.

Various embodiments may comprise a data repository and embedded system security features. Various embodiments may be used by interconnection contractors (e.g., solar contractors), utility customers, and utility personnel. Various embodiments may be comprise various modules that are configured to allow a customer or contractor to log in, to create and/or submit an interconnection application of multiple types (e.g., include NEM<30 KW, NEM>=30 KW, DG Behind the Meter), and have a unique identifier assigned to the application; to allow a customer or contractor to save a partially completed application and resume the application at a later time; to delete an application in draft status; to print a copy of the application; to validate information provided by a user; to allow a user to upload a document (e.g., an interconnection agreement, or a document to qualify for a "fast track" application) associated with the application; to allow a user to review the status of an application via various user devices; to allow a user to download any previously sent emails or documents that are uploaded during the application process prior to the application approval; to revise (e.g., fix an error) a previously submitted application that is marked as incomplete; to notify a user of key activities such as the utility receiving the application, receipt of AHJ inspection and notification of pending inspection, notification of an incomplete application or an application with inspection issues, and notification of a "permission to turn on" letter including other important documents supplied by the utility; to track AHJ inspections that do not match a pending application in an "inspection hold" table for later automated match-up to a newly submitted application; and/or to allow a user (e.g., an interconnection contractor) to authorize more than one employees to work on an application on behalf of the user.

Various embodiments may comprise one or more modules that are configured to allow an interconnection contractor to assign a "company administrator" who may approve accesses to new employees and/or revoke accesses to existing employees; to provide communications to a user for application status to go to all active individuals authorized by the user; to provide a different view to the external users and/or contractors than to the internal individuals; to "process" applications by reviewing the components of the application and associated uploaded documents, and generate appropriate review status (e.g., accepted and/or incomplete) and provide corresponding notifications to both the utility user and the interconnection contractor; to automatically load AHJ inspection completion dates through the use of an integration web service call, and to allow authorized utility employees to load AHJ inspection dates directly; to provide utility customers the ability to view, print or save a copy of their completed application upon and after their approval; to track the utility customer's agreement to the terms and conditions of the interconnection agreement and application via various mechanisms such as through an optional upload of a utility customer signed interconnection agreement and application, or through an online form where a utility customer is authenticated and is able to view and/or accept the terms and conditions of the interconnection agreement and application; to allow utility employees to view all interconnection applications including the ones that are approved and pending, interconnection prime mover type (e.g., solar, wind), associated with the premise and service point of the currently viewed application; to allow utility employees to delete applications that are in draft status; to allow utility employees to view both the original application as entered by the contractor as well as the pertinent aspects of the application on a series of tabs on a screen (e.g., an application review screen); to allow utility employees to create or review comments for record keeping or for another utility employee; to allow a utility employee to view the current smart meter program for the utility meter installed at the customer's premise/service point, and to request a remote meter configuration if required (if the appropriate integration points are configured), to set up utility employees for read-only access so that they have no permission to modify an application; to allow a set of utility employees (e.g., with "CG" access to change the status of an application, and an interconnection contractor and a utility customer may be notified of a certain change in status, for example, a change to an approved status may call a setup web service to notify another system to perform any required procedures to set up a customer on the correct programs; to update certain fields and information about an application, and to save those changes in a database; and/or to grant an administrator access to utility employees so that they can perform additional functions such as to allow the utility to update the company administrator for any interconnection contractor; to add new values to lookup tables; to add a system message, to be displayable to all logged in users, to display between a specific start date/time and end date/time, to terminate an existing system message, to set a user's role to include one or more functions from read-only, customer generation, reporting, and administrator role, or disable access, to disable the contractor fast track privileges for an individual contractor, to add new values to lookup tables such as incomplete reason, issues, system type, customer type, and disaster code; to enter a new interconnection contractor company, on behalf of such company; to edit and add values that classify each application type (e.g. Virtual Net Metering, Net Energy Metering Aggregation, et cetera); to toggle one or more applications and assign those applications to other internal users for processing, which will create a searchable value based on the internal user processing the application as well as history of assignments; to edit information (e.g., name, address, phone number) for an interconnection company.

Various embodiments may comprise various modules configured to retrieve information such as unauthorized reverse power flow information associated with specific meters and current customers regularly (e.g., on a weekly basis); to configure the information retrieved for unauthorized reverse power flow to recognize all new and re-occurring unauthorized reverse power flow, and/or all new and re-occurring unauthorized reverse power flow suspected to be solar; to stop importing reverse power flow information for a particular meter if the corresponding customer and meter is pending investigation by another utility department such as Meter Revenue Protection; to manually import reverse power flow information for a particular customer account if the account was referred by another utility department, such as Meter Revenue Protection; to track actions taken for a specific customer to stop the unauthorized reverse power flow; to query on customer related unauthorized reverse power flow based on the last action taken, and the date of last reverse power flow detected; to use query results for unauthorized reverse power flow as input to an outbound dialer system to automatically call and track response to such calls; to automatically load outbound dialer call results back into various modules (e.g., reverse power flow module); to note a change in account, where the unauthorized reverse power flow continued both before and after a change of utility account; to allow utility employees to note comments provided by the customer in case they call and discuss with the utility; to automatically close unauthorized reverse power flow if the account for that meter has either become authorized, or if there has been unauthorized reverse power flow for longer than a certain time duration; to allow a utility employee to refer a reverse power flow investigation to another group, such as Meter Revenue Protection; and/or to run various tasks such as to load current customer information about each premise/service point along with the change of account date, to report all customers setup in an external system through a web service, where the results may be organized into a successful and an unsuccessful group; to synchronize the valid inverters and solar panels from the GoSolarCalifornia web site of pre-authorized equipment; to update the pole/pad number field in the database from another database that ties a customer to a specific pole/pad number; to update the virus database for the virus detection software to scan document uploaded by a user; and/or to match up records in an inspection hold table with newly submitted applications, and setting the AHJ inspection date when a match is found.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 700. After reading this description, it will become apparent to a person skilled in the relevant art how to implement the application using other computing modules or architectures.

FIG. 4 illustrates a computing module 400 comprising, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for automating interconnections from distributed utility customers into a plurality of distributed utilities, the method comprising:
   obtaining distributed utility interconnection application from a customer generating power, the application comprising distributed utility interconnection application information, the application information specifying utility customer identifying information and utility identifying information;
   generating a customer account using customer identifying information obtained via the application information;
   obtaining an authorization from a distributed utility based on a review mechanism performed by the utility such that a power flow generated by the utility customer may be detected; and
   recording power generated by the customer using a power flow detection process.

2. The method of claim 1, wherein power flow recording process comprises a reverse power flow detection process to track and manage unauthorized operators.

3. The method of claim 2, further comprising using the reverse power flow detection process to indicate a meter program setup for bi-directional reads.

4. The method of claim 2, further comprising using the reverse power flow detection process to detect a likely theft.

5. The method of claim 2, further comprising using the reverse power flow detection process to detect a likely bad install of meter.

6. The method of claim 2, further comprising using the reverse power flow detection process to detect a likely meter wiring issue.

7. The method of claim 1, further comprising providing a Fast Track process that allows the customer to bypass the utility inspection.

8. The method of claim 1, further comprising providing an unauthorized reverse power flow process for tracking and managing unauthorized systems.

9. The method of claim 8, further comprising generating reports of unauthorized operators.

10. The method of claim 1, further comprising determining whether power generated by the customer generation is solar.

11. The method of claim 1, further comprising receiving an acceptance of an interconnection agreement terms and conditions from the customer.

12. The method of claim 1, further comprising displaying terms and conditions of an interconnection agreement to the customer and requesting an acceptance of the terms and conditions by the customer.

13. A computer-implemented method for automating data received from power meters associated with customers interconnected into a plurality of distributed utilities, the method comprising:
   obtaining distributed utility interconnection application from a customer generating power, the application comprising distributed utility interconnection application information, the application information specifying utility customer identifying information and utility identifying information;
   generating a customer account using customer identifying information obtained via the application information;
   obtaining an authorization from a distributed utility based on a review mechanism performed by the utility such that a power flow generated by the utility customer may be detected
   detecting power generated by the customer interconnected into a distributed utility via a power meter;
   determining a direction of a power flow at the power meter; and
   recording power generated by the customer using a reverse power flow detection process;
   whereas power is recorded as a set of power flow records associated with the power meter interconnected by the customer.

14. The method of claim 13, further comprising tracking and managing unauthorized operators.

15. The method of claim 13, further comprising indicating a meter program setup for bi-directional reads.

16. The method of claim 13, further comprising using the reverse power flow detection process to detect likely theft.

17. The method of claim 13, further comprising using the reverse power flow detection process to detect a likely bad install of meter.

18. The method of claim 13, further comprising using the reverse power flow detection process to detect a likely meter wiring issue.

* * * * *